US012719168B2

(12) United States Patent
Graf et al.

(10) Patent No.: US 12,719,168 B2
(45) Date of Patent: Aug. 25, 2026

(54) MULTIPLE-BAND CIRCULAR PARASITIC ARRAY ASSEMBLY HAVING MULTIPLE CIRCULAR PARASITIC ARRAYS

(71) Applicant: Rockwell Collins, Inc., Cedar Rapids, IA (US)

(72) Inventors: Joseph T. Graf, Center Point, IA (US); James B. West, Cedar Rapids, IA (US); Jiwon L Moran, Marion, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 243 days.

(21) Appl. No.: 18/223,901

(22) Filed: Jul. 19, 2023

(65) Prior Publication Data

US 2025/0030164 A1 Jan. 23, 2025

(51) Int. Cl.
*H01Q 5/378* (2015.01)
*H01Q 3/24* (2006.01)

(52) U.S. Cl.
CPC ............... *H01Q 5/378* (2015.01); *H01Q 3/24* (2013.01)

(58) Field of Classification Search
CPC ................................ H01Q 5/378; H01Q 3/24
See application file for complete search history.

(56) References Cited

U.S. PATENT DOCUMENTS 6,336,728 B1 1/2002 Deloy
6,419,372 B1 7/2002 Shaw et al.
6,574,030 B1 6/2003 Mosier
6,639,349 B1 10/2003 Bahadur
6,714,186 B1 3/2004 Mosier et al.
6,842,204 B1 1/2005 Johnson
6,972,729 B2 12/2005 Wang
7,025,474 B2 4/2006 Campbell et al.
(Continued)

FOREIGN PATENT DOCUMENTS

CN 105514584 A * 4/2016 ......... H01Q 21/0006
CN 119153926 A * 12/2024 ............. H01Q 21/00
KR 20180090715 A 8/2018

OTHER PUBLICATIONS

European Patent Office, Extended European Search Report received in EP Application No. 24188418.8, Nov. 15, 2024, 9 pages.
(Continued)

*Primary Examiner* — Henry Luong
(74) *Attorney, Agent, or Firm* — ter S Swantz IP

(57) ABSTRACT

A system may include a circular parasitic array assembly. The circular parasitic array assembly may include a first circular parasitic array configured to at least one of transmit or receive over a first bandwidth, the first circular parasitic array defined by a physical cylindrical volume. The circular parasitic array assembly may further include at least one positioned circular parasitic array including a first positioned circular parasitic array, each of the at least one positioned circular parasitic array positioned at least one of within the physical cylindrical volume of the first circular parasitic array or above the physical cylindrical volume of the first circular parasitic array, wherein the first positioned circular parasitic array is configured to at least one of transmit or receive over a second bandwidth, the second bandwidth being a higher frequency bandwidth than the first bandwidth.

20 Claims, 5 Drawing Sheets

(56) References Cited

U.S. PATENT DOCUMENTS

| | | | |
|---|---|---|---|
| 7,036,946 | B1 | 5/2006 | Mosier |
| 7,081,991 | B2 | 7/2006 | Jones et al. |
| 7,481,954 | B2 | 1/2009 | Warren, Jr. et al. |
| 8,089,579 | B1 | 1/2012 | Johnson et al. |
| 8,604,987 | B1 | 12/2013 | Doane |
| 8,641,219 | B1 | 2/2014 | Johnson et al. |
| 8,681,290 | B1 | 3/2014 | Hufnagel et al. |
| 8,830,132 | B1 | 9/2014 | Doane et al. |
| 8,842,055 | B2 | 9/2014 | Murdock et al. |
| 8,878,728 | B1 | 11/2014 | Livadaru et al. |
| 8,956,034 | B1 | 2/2015 | Johnson |
| 8,963,774 | B1 | 2/2015 | Livadaru et al. |
| 9,196,959 | B1 | 11/2015 | Doane et al. |
| 9,711,866 | B1 | 7/2017 | Doane et al. |
| 9,836,089 | B1 | 12/2017 | Covington et al. |
| 9,866,268 | B2 | 1/2018 | King et al. |
| 10,191,199 | B2 | 1/2019 | Nichol et al. |
| 10,212,752 | B1 | 2/2019 | Poduska et al. |
| 10,239,634 | B2 | 3/2019 | Johnson |
| 10,274,661 | B1 | 4/2019 | Johnson et al. |
| 10,573,217 | B2 | 2/2020 | Johnson |
| 10,598,848 | B2 | 3/2020 | Coleman et al. |
| 10,775,662 | B2 | 9/2020 | Johnson |
| 10,935,716 | B2 | 3/2021 | Nichol et al. |
| 10,996,511 | B1 | 5/2021 | Walker et al. |
| 11,102,860 | B2 | 8/2021 | Johnson |
| 11,256,025 | B2 | 2/2022 | Nichol et al. |
| 11,325,690 | B1 | 5/2022 | Graf et al. |
| 2016/0328065 | A1 | 11/2016 | Johnson et al. |
| 2018/0100945 | A1 | 4/2018 | Ewe et al. |
| 2021/0302780 | A1 | 9/2021 | Johnson et al. |
| 2022/0179148 | A1 | 6/2022 | Coleman et al. |
| 2022/0398987 | A1 | 12/2022 | Wyatt |
| 2023/0011530 | A1 | 1/2023 | Nichol et al. |
| 2025/0030163 | A1 | 1/2025 | West et al. |

OTHER PUBLICATIONS

European Patent Office, Extended European Search Report received in EP Application No. 24188462.6, Nov. 15, 2024, 9 pages.

Shibata et al., "Dual-band ESPAR antenna for wireless LAN applications," Antennas and Propagation Society Symposium, IEEE, vol. 2B, Jul. 3, 2005, 4 pages.

"Full Duplex Transmit/Receive"; https://web.archive.org/web/20221220090616/https://www.microwaves101.com/encyclopedias/full-duplex-transmit-receive; published Jun. 1, 2020.

https://web.archive.org/web/20220704191944/https://www.appliedavionics.com/pdf/MIL-STD-3009.pdf; Publication date: Feb. 2, 2001.

* cited by examiner

MULTIPLE-BAND CIRCULAR PARASITIC ARRAY ASSEMBLY HAVING MULTIPLE CIRCULAR PARASITIC ARRAYS

BACKGROUND

Directional communications in connected battle space typically have multi-frequency multi-function data link communications capabilities, such as used in air platforms (e.g., size, weight, and, power, and cost (SWaP-C) limited attritable assets and future vertical lift (FVL) air platforms). A circular parasitic array (CPA) is an example of a very SWaP-C optimized and very low-cost active electronically steered antenna (AESA) that can provide reconfiguration of omni and directional fan beam direction modes with 360° azimuthal beam steering, such as by means of on/off switch (e.g., diodes) actuation to or from azimuthal directional beam scanning. Typically, a CPA's beam steering controller is much simpler than that of a planar two-dimensional (2D) AESA, which cannot produce 360° azimuthal beam coverage with a single planar 2D AESA panel. Currently, existing CPAs cannot enable multi-band communication where frequency bands are widely separated, such as a separation between C band and Ka band.

SUMMARY

In one aspect, embodiments of the inventive concepts disclosed herein are directed to a system. The system may include a circular parasitic array assembly. The circular parasitic array assembly may include a first circular parasitic array configured to at least one of transmit or receive over a first bandwidth, the first circular parasitic array defined by a physical cylindrical volume. The circular parasitic array assembly may further include at least one positioned circular parasitic array including a first positioned circular parasitic array, each of the at least one positioned circular parasitic array positioned at least one of within the physical cylindrical volume of the first circular parasitic array or above the physical cylindrical volume of the first circular parasitic array, wherein the first positioned circular parasitic array is configured to at least one of transmit or receive over a second bandwidth, the second bandwidth being a higher frequency bandwidth than the first bandwidth.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
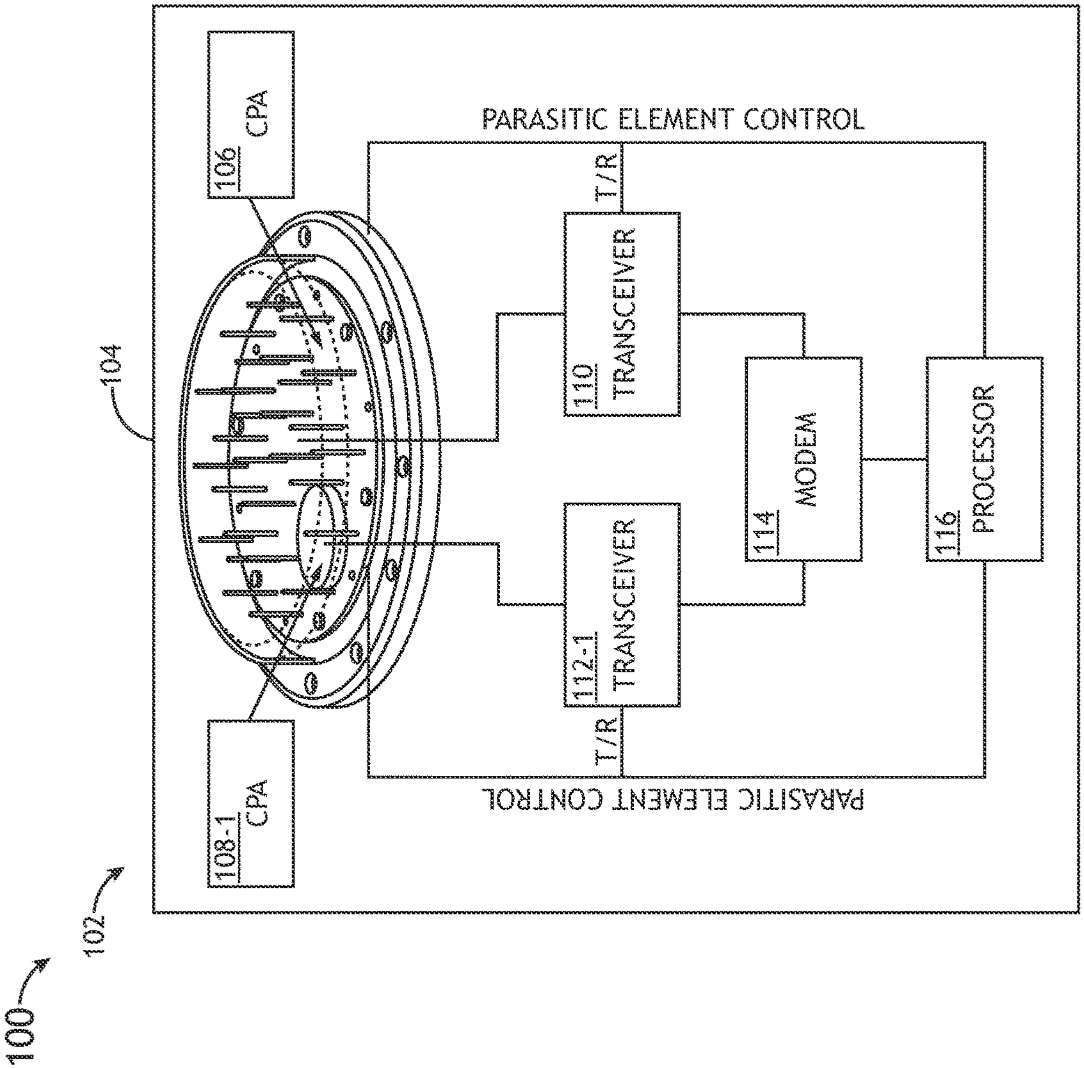
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to a method and a system including circular parasitic array assembly (e.g., a multiple-band circular parasitic array assembly). In some embodiments, the circular parasitic array assembly may include a first circular parasitic array and at least one positioned circular parasitic array. Each of the at least one positioned circular parasitic array may be positioned within the physical cylindrical volume of the first circular parasitic array and/or above the physical cylindrical volume of the first circular parasitic array.

Some embodiments may include a multiple (e.g., dual, triple, quadruple, quintuple, etc.) band integrated antenna structure (e.g., a circular parasitic array assembly) in which at least one high frequency (e.g., a Ku band and/or a Ka band) CPA is positioned within (e.g., embedded within) or above a low frequency (e.g., C band) CPA, which may keep overall antenna dimensions the same as the low frequency (e.g., C band) single CPA. In some embodiments, each of the multiple CPAs may be created using a conventional monolithic radiofrequency (RF) printed circuit board (PCB) process and integrated together. Equivalent functionality of such embodiments is not currently available in the market. Some embodiments, may include miniature, SWaP-C multiple-band circular parasitic array assembly having omnidirectional and/or directional modality with very simple beam steering control.

Some embodiments may include creating a multiple frequency integrated antenna structure in which a higher frequency (e.g., Ku Band and/or a Ka band) CPA is embedded within a lower frequency (e.g., a C Band) CPA to keep overall antenna dimensions the same as the single lower frequency (e.g., C Band) CPA. In some embodiments, each CPA may be created using a conventional radiofrequency (RF) printed circuit board (PCB) process and integrated together.

Some embodiments may provide multiple band CPA operation simply and inexpensively, for example, that enables multi-band datal link dual mode omni and/or directional operation that is orders of magnitude less expensive than current AESAs required for 360° azimuthal coverage.

Some embodiments provide an assembly including multiple band CPA assembly having a common assembly while minimally perturbing each of the CPAs of the assembly.

In some embodiments, multiple modes of operations are available for a CPA assembly, such as any of the following: passive omnidirectional C-band, active directional Ku-band; Active directional C-band, passive omnidirectional Ku-band; and/or Active directional C-band and active directional Ku-band.

In some embodiments, symmetric shunt loading due to a Ku ground plane can help optimize instantaneous bandwidth of a C-band CPA.

In some embodiments, a CPA assembly may include two Ku-band antennas at omnidirectional mode within less than 1 lambda so as to can increase antenna gain.

Some embodiments provide a small form factor with low aerodynamic drag antenna subsystems to enable extreme SWaP-C multiple band frequency operation for directional communications. Some embodiments may provide a solution for a Ku-band antenna that meets needs of ALE Small as, currently, no commercially available technology meets required SWAP.

Referring now to FIGS. 1-4, an exemplary embodiment of a system 100 according to the inventive concepts disclosed herein are depicted. The system 100 may be implemented as any suitable system. In some embodiments, the system 100 may include a vehicle (e.g., an aircraft 102 (e.g., a piloted aircraft, an unmanned aerial system (e.g., an Air Launched Effect(s) (ALE) and/or a remote-piloted aircraft)), an automobile, a spacecraft, or a watercraft). For example, Air Launched Effects (ALE) are a Family of Systems (FoS) may include an air vehicle, payload(s), mission system applications, and associated support equipment designed to autonomously or semi-autonomously deliver effects as a single agent or as a member of a team. For example, as shown in FIG. 1, the system 100 may include a circular parasitic array assembly 104. In some embodiments, the circular parasitic array assembly 104 may be installed on the vehicle or at any of suitable stationary or mobile locations.

Figures 2A, 2B, 2C:
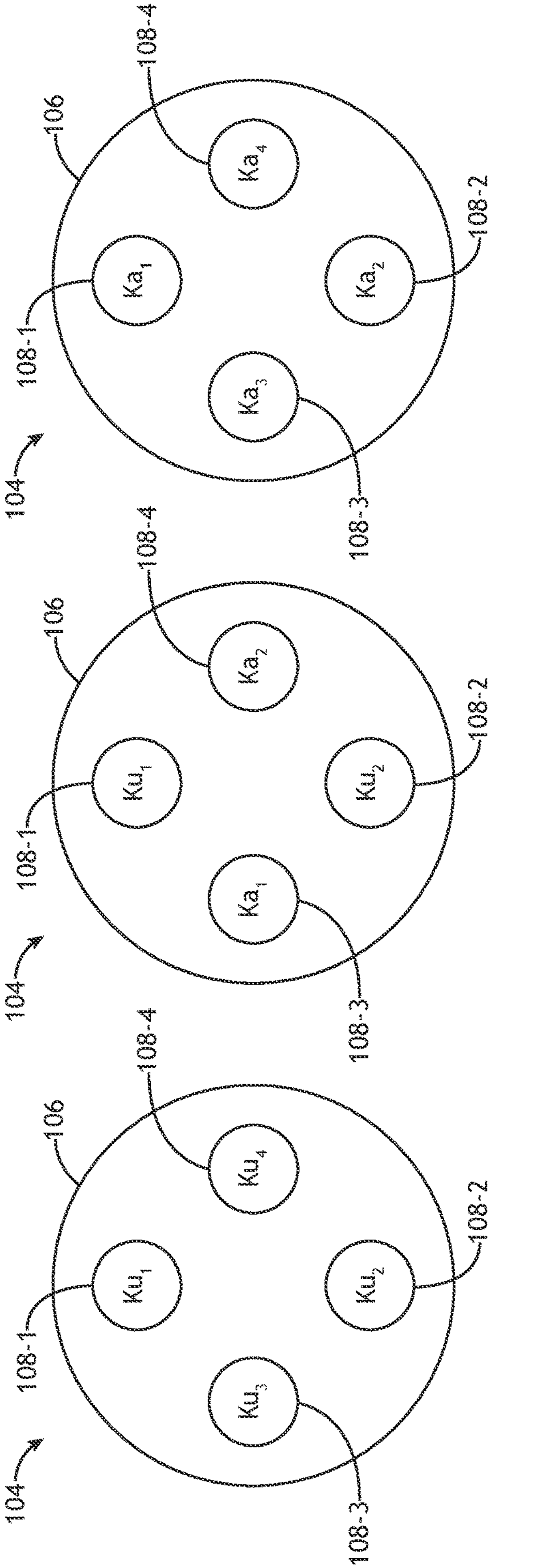
FIGS. 2A, 2B, and 2C are views of exemplary embodiments of the circular parasitic array assembly of the system of FIG. 1 according to the inventive concepts disclosed herein.

In some embodiments, the circular parasitic array assembly 104 may include a first circular parasitic array 106, at least one positioned circular parasitic array (e.g., a first positioned circular parasitic array 108-1, a second positioned circular parasitic array 108-2, a third positioned circular parasitic array 108-3, and/or a fourth positioned circular parasitic array 108-4 (as shown in FIGS. 2A-2C)), a first transceiver 110, at least one other transceiver (e.g., 112-1; e.g., each of which may be associated with one of the at least one positioned circular parasitic array (e.g., 108-1, 108-2, 108-3, 108-4)), at least one modem 114, and/or at least one processor 116 (e.g., at least one beam controller (e.g., one joint beam controller or a beam controller for each of the circular parasitic array 106 and the at least one positioned circular parasitic array (e.g., 108-1, 108-2, 108-3, 108-4)), some or all of which may be communicatively coupled (e.g., electrically coupled) at any given time. In some embodiments, the at least one processor 116 may be located on another device, which may be communicatively coupled to the circular parasitic array assembly 104.

Figure 3A:
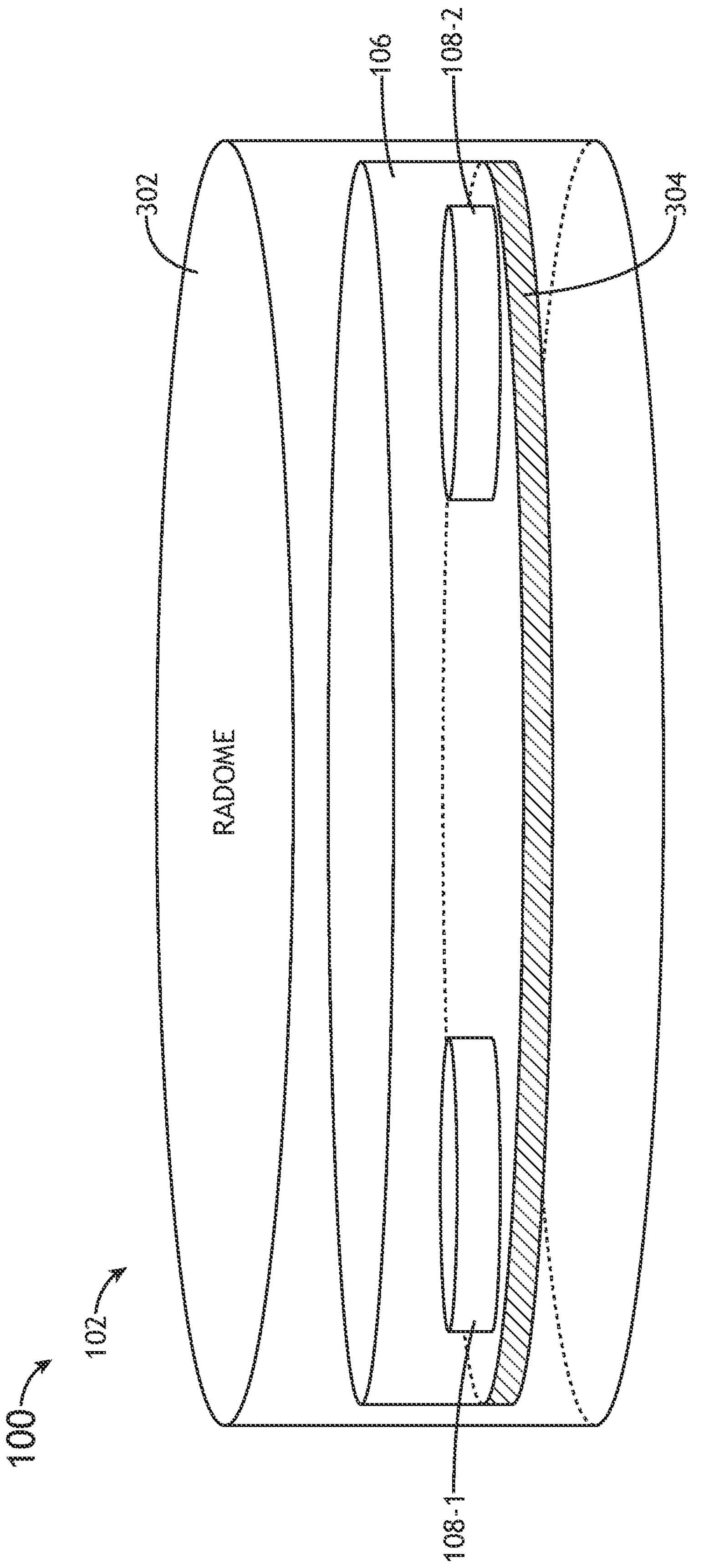
FIGS. 3A and 3B include views of exemplary embodiments of the circular parasitic array assembly of the system of FIG. 1 according to the inventive concepts disclosed herein.
Figure 3B:
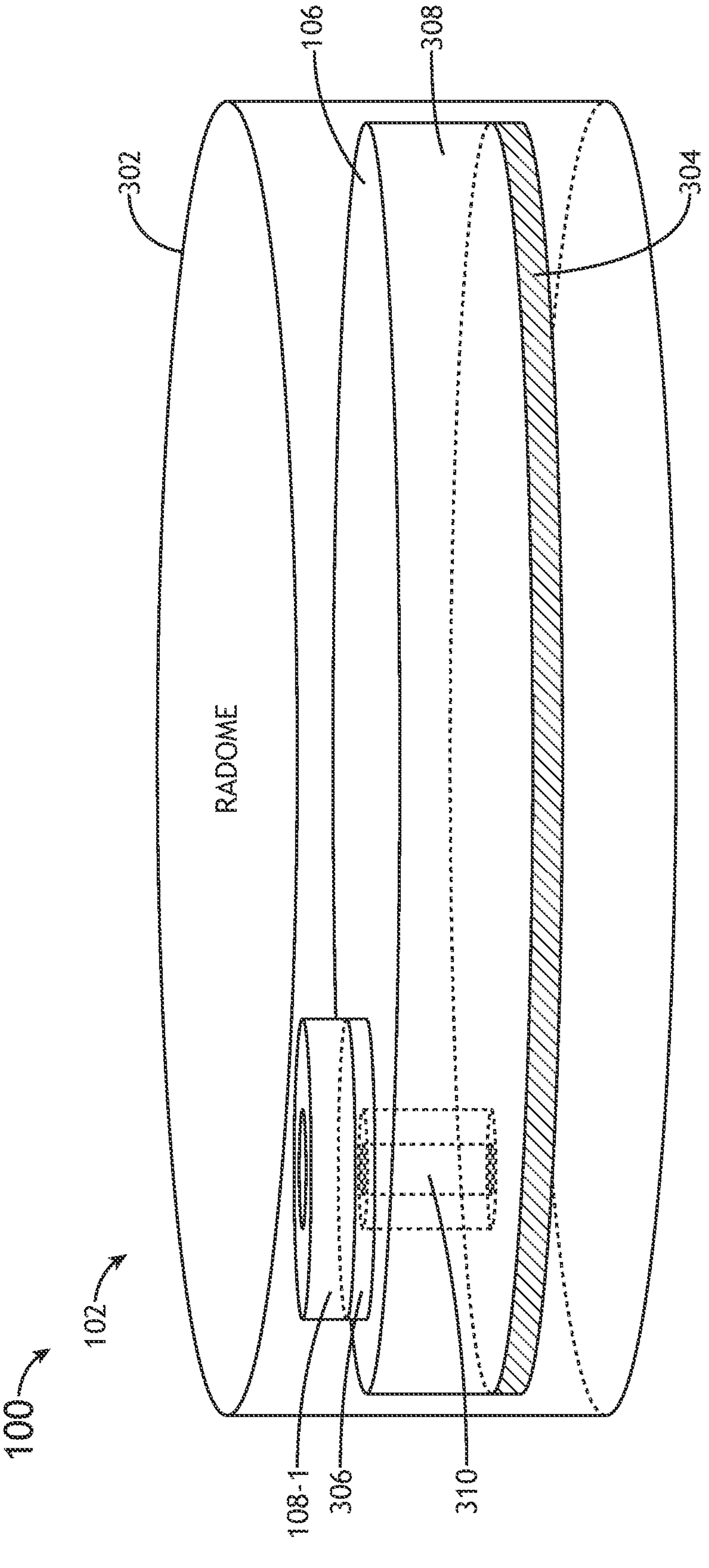

The first circular parasitic array 106 may be any suitable type of circular parasitic array 106. For example, the first circular parasitic array 106 may include monopoles (e.g., center driven monopole 402 and/or switched monopoles 404), a dielectric substrate 308, and/or a printed circuit board (PCB) 304 (as shown in FIG. 3A-B) (e.g., which may have a ground plane). For example, the first circular parasitic array 106 may be configured to at least one of transmit or receive over a first bandwidth (e.g., any suitable bandwidth; e.g., which may be a higher frequency bandwidth than a bandwidth of each of the at least one positioned circular parasitic array (e.g., 108-1, 108-2, 108-3, 108-4)). The first circular parasitic array 106 may be defined by a physical cylindrical volume, which for example, may enclose (e.g., enclose and abut at least some of the following) the monopoles (e.g., 402 and/or 404), the dielectric substrate 308, and/or the PCB 304.

Each of the at least one positioned circular parasitic array (e.g., a first positioned circular parasitic array 108-1, a second positioned circular parasitic array 108-2, a third positioned circular parasitic array 108-3, and/or a fourth positioned circular parasitic array 108-4 (as shown in FIGS. 2A-2C)) may be any suitable type of circular parasitic array 106. For example, each of the at least one positioned circular parasitic array (e.g., 108-1, 108-2, 108-3, and/or 108-4) may include monopoles (e.g., a center driven monopole and/or switched monopoles), a dielectric substrate, and/or a PCB 306 (as shown in FIG. 3B) (e.g., which may have a ground plane), any or all of which may be similar and function similar to those of the first circular parasitic array 106 except that the components of each of the at least one positioned circular parasitic array (e.g., 108-1, 108-2, 108-3, and/or 108-4) may be smaller than those components of the first circular parasitic array 106. Each of the at least one positioned circular parasitic array (e.g., 108-1, 108-2, 108-3, and/or 108-4) may be positioned within the physical cylindrical volume of the first circular parasitic array 106 and/or above the physical cylindrical volume of the first circular parasitic array 106. Each of the at least one positioned circular parasitic array may be configured to transmit and/or receive over a given bandwidth (e.g., any suitable bandwidth, which may be the same or different for each of the at least one positioned circular parasitic array), wherein the given bandwidth is a higher frequency bandwidth than the first bandwidth of the first circular parasitic array 106.

In some embodiments, the first transceiver 110 may be at least connected to the first circular parasitic array 106. Each of the at least one other transceiver (e.g., 112-1) may be at least connected to one of the at least one positioned circular parasitic array (e.g., 108-1, 108-2, 108-3, 108-4). The modem 114 may be at least connected to each of the first transceiver 110 and the at least one other transceiver (e.g., 112-1). The at least one processor 116 may be at least connected to the modem 114 and/or a radio 118. The circular parasitic array assembly 104 may have parasitic element control for each of the first circular parasitic array 106 and the at least one positioned circular parasitic array (e.g., 108-1, 108-2, 108-3, 108-4). In some embodiments, each CPA (e.g., 106, 108-1, 108-2, 108-3, and/or 108-4) can have its own relatively simple processor (e.g., 116; e.g., a microcontroller) integrated into the CPA assembly 104, such as via pass-through control. In some embodiments, the CPA assembly 104 may include a processor 116, which may function as a master controller (e.g., which may be a field-programmable gate array (FPGA)), that can pipe command signals at the transceiver/modem level to all of the CPAs (e.g., 106, 108-1, 108-2, 108-3, and/or 108-4).

In some embodiments, the at least one processor 116 may include any number and/or type(s) of processor. In some embodiments, one or more of the at least one processor 116 may have software-defined radio (SDR) functionality and/or non-SDR functionality. For example, the at least one processor 116 may be configured as a common dual or multiple band beam steering controller that can interface to each CPA 106, 108-1, 108-2, 108-3, and/or 108-4 of the circular parasitic array assembly 104. For example, the at least one processor 116 may be and/or may include at least one beam controller, at least one radiofrequency (RF) processor, at least one RF system on chip (SOC), at least one general purpose processor (e.g., at least one central processing unit (CPU)), at least one digital signal processor (DSP), at least one application specific integrated circuit (ASIC), and/or at least one field-programmable gate array (FPGA). The at least one processor 116 may be configured to perform (e.g., collectively perform if more than one processor) any or all of the operations disclosed throughout. The at least one processor 116 may be configured to run various software and/or firmware applications and/or computer code stored (e.g., maintained) in a non-transitory computer-readable medium (e.g., memory) and configured to execute various instructions or operations. In some embodiments, the at least one processor 116 may be communicatively coupled to various elements of the circular parasitic array assembly 104.

Referring to FIGS. 2A, 2B, and 2C, exemplary embodiments of the circular parasitic array assembly 104 are shown, according to the inventive concepts disclosed herein are depicted.

As shown, in FIG. 2A, the first circular parasitic array 106 may be configured to transmit and/or receive in a C band; a first positioned circular parasitic array 108-1 may be configured to transmit and/or receive in a first Ku band; a second positioned circular parasitic array 108-2 may be configured to transmit and/or receive in a second Ku band; a third positioned circular parasitic array 108-3 may be configured to transmit and/or receive in a third Ku band; and/or a fourth positioned circular parasitic array 108-4 may be configured to transmit and/or receive in a fourth Ku band, wherein the first, second, third, and fourth Ku bands may be the same or different.

As shown, in FIG. 2B, the first circular parasitic array 106 may be configured to transmit and/or receive in a C band; a first positioned circular parasitic array 108-1 may be configured to transmit and/or receive in a first Ku band; a second positioned circular parasitic array 108-2 may be configured to transmit and/or receive in a second Ku band; a third positioned circular parasitic array 108-3 may be configured to transmit and/or receive in a first Ka band; and/or a fourth positioned circular parasitic array 108-4 may be configured to transmit and/or receive in a second Ka band.

As shown, in FIG. 2C, the first circular parasitic array 106 may be configured to transmit and/or receive in a C band; a first positioned circular parasitic array 108-1 may be configured to transmit and/or receive in a first Ka band; a second positioned circular parasitic array 108-2 may be configured to transmit and/or receive in a second Ka band; a third positioned circular parasitic array 108-3 may be configured to transmit and/or receive in a third Ka band; and/or a fourth positioned circular parasitic array 108-4 may be configured to transmit and/or receive in a fourth Ka band, wherein the first, second, third, and fourth Ka bands may be the same or different.

As shown in FIGS. 2A-C, in some embodiments, multiple Ku and/or Ka band CPAs (e.g., 108-1, 108-2, 108-3, and/or 108-4) can reside in the CPA assembly 104 to: enhance Ku and/or Ka Band system capability; symmetrically perturb a C Band CPA (e.g., 106) to improve performance in the presence of the Ku and/or Ka Band CPAs (e.g., 108-1, 108-2, 108-3, and/or 108-4). In some embodiments, the CPA assembly 104 may be a dual band, a triple band, quadruple band system, or a quintuple band CPA assembly. In some embodiments, a symmetric (e.g., radially symmetric) layout of the higher frequency CPAs (e.g., 108-1, 108-2, 108-3, and/or 108-4) may create less perturbation to the lower frequency CPA (e.g., 106). In some embodiments, the added number of higher frequency CPAs may enhance overall data link system functionality.

Referring to FIGS. 3A and 3B, exemplary embodiments of the circular parasitic array assembly 104 are shown, according to the inventive concepts disclosed herein are depicted. In some embodiments, the circular parasitic array assembly 104 may be covered by a radome 302.

As shown in FIG. 3A, one or more of the at least one positioned circular parasitic array (e.g., 108-1, 108-2, 108-3, and/or 108-4) may be positioned (e.g., embedded) within the physical cylindrical volume of the first circular parasitic array 106. The first and second positioned circular parasitic arrays 108-1, 108-2 may each comprise a PCB 306 (e.g., as illustrated in FIG. 3B). The first circular parasitic array 106 may comprise a ground plane having a first void, wherein the PCB 306 of the first positioned circular parasitic array 108-1 may be positioned (e.g., mechanically attached) within the first void of the ground plane. The first circular parasitic array 106 may comprise the ground plane also having a second void, wherein the PCB 306 of the second positioned circular parasitic array 108-2 may be positioned within the second void of the ground plane.

In some embodiments, for example, C Band reflector/director monopoles (e.g., 404) may be removed under a perimeter (and area within the perimeter) of the Ku Band CPA. In some embodiments, four Ku Band CPAs arranged in north/south/east/west symmetry arrangement may have acceptable C Band perturbation.

As shown in FIG. 3B, one or more of the at least one positioned circular parasitic array (e.g., 108-1, 108-2, 108-3, and/or 108-4) may be positioned within the physical cylindrical volume of the first circular parasitic array 106 and/or above (e.g., partially above or directly above) the physical cylindrical volume of the first circular parasitic array 106. The first positioned circular parasitic arrays 108-1 may each comprise a PCB 306. The first circular parasitic array 106 may comprise a dielectric substrate positioned above first circular parasitic array's 106 PCB 304. In some embodiments, one or more of the at least one positioned circular parasitic array (e.g., 108-1, 108-2, 108-3, and/or 108-4) may be positioned above the dielectric substrate 308. In some embodiments, one or more of the at least one positioned circular parasitic array (e.g., 108-1, 108-2, 108-3, and/or 108-4) may have a separate feed line 310 (e.g., coax feed line, such as a micro-coax feed line). For example, such an exemplary embodiment disclosed in FIG. 3B may minimize undesirable CPA- (e.g., 106) to-CPA (e.g., 108-1) RF interactions. In some embodiments, a Ku Band CPA (e.g., 108-1) may be fed with small form factor micro-coax to minimize C Band CPA perturbation.

In some embodiments, the C Band CPA reflector/director monopoles (e.g., 404) may reside under the Ku CPA (e.g., 108-1). The Ku Band CPA may be above the C Band CPA within close vicinity. The C Band reflectors/director monopole lengths in the vicinity of the Ku CPA may be foreshortened to account for parasitic effects.

In some embodiments, the Ku band CPA of the CPA assembly 104 may be reinforced by including structural foam inside the radome 302, the radome 302 being mechanically designed to be a "receptacle" for the Ku CPA, and/or the Ku Band CPA may have a "from the top" feed line 310 drop in assembly.

Referring still to FIG. 3B, some embodiments may include symmetric shunt loading of the monopole elements. For example, a Ku Band CPA's ground bottom side may act as a capacitive top-hat load of a monopole and should drive resonant frequencies of the C Band pins directly under to be down in frequency. In some embodiments, this effect may be compensated for by fore shortening those C Band monopoles directly under the Ku Band ground.

Referring still to FIG. 3B, in some embodiments, the Ku Band beam controller may be located on a bottom side of the Ku Band RF ground. Some embodiments may include electromagnetic interference (EMI) shielding to minimize Ku/C Band interaction.

Figure 4:
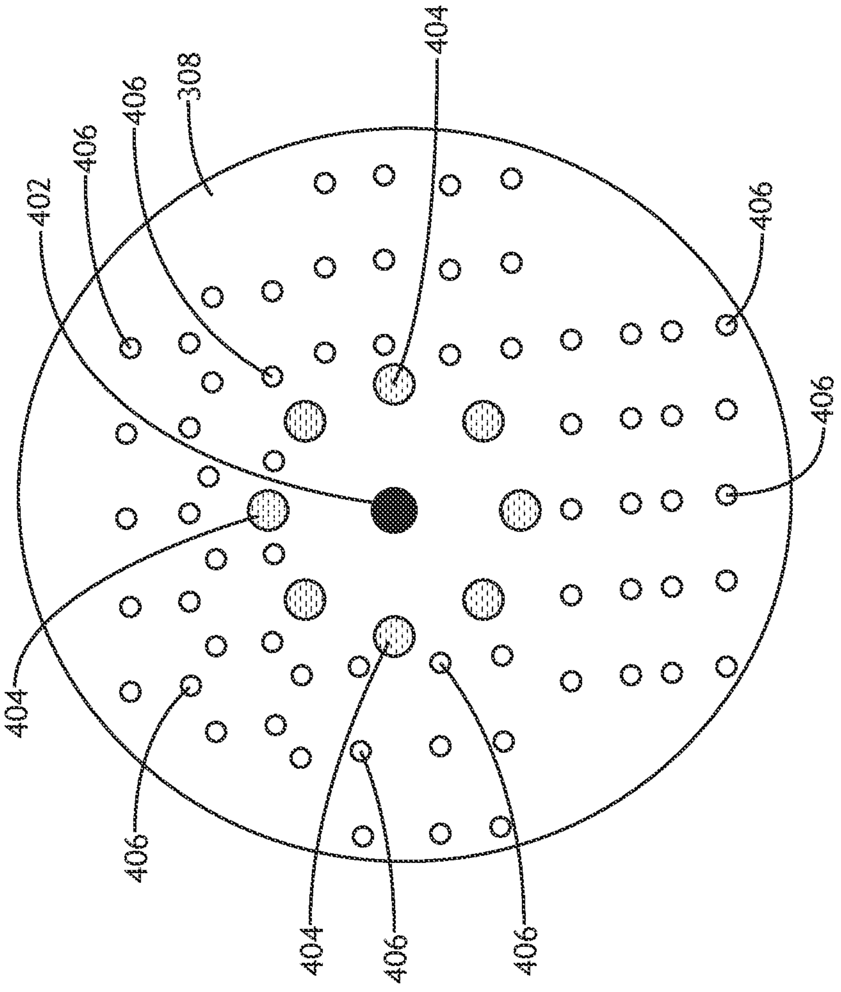
FIG. 4 is view of exemplary embodiment of a first circular parasitic array of the circular parasitic array assembly of the system of FIG. 1 according to the inventive concepts disclosed herein.

Referring now to FIG. 4, an exemplary embodiment of the first circular parasitic array 106 of the circular parasitic array assembly 104 is shown, according to the inventive concepts disclosed herein are depicted.

As shown in FIG. 4, the first circular parasitic array 106 may include a dielectric substrate 308 having an array of holes 406. The first circular parasitic array 106 may include a center, driven monopole 402 and a plurality of switched monopoles 404 (which may also be referred to director monopoles (for the off state) or reflector monopoles for the on state).

Generally, antenna performance favors construction with low loss dielectric materials. Currently, COTS dielectric substrate materials used on antenna constructions vary between a dielectric constant ($d_k$)=2.1 to $d_k$=38. Typically, the higher the dielectric constant, there is electrically smaller the antenna structure as a function of wavelength. Typically, dielectric loading of an antenna creates two very undesirable effects: the unloaded Q of the antenna raise, which lower the impedance bandwidth, which may be a significant effect for some antenna architectures; and input terminals' self-impedance match of the antenna may worsen, and in many cases, cannot be adequately compensated for by a conventional reactive impedance matching network. For some embodiments, CPA antenna design may result from a complex interaction between the center driven monopole, the "off state" director monopoles and the on-state "reflector" monopoles, monopole height, and the dielectric constant surrounding the monopoles. In general, lowering the dielectric constant of the CPA antenna raises its resonant frequency and can also improve radiation and impedance performance of the antenna. In some embodiments, the dielectric constant can be adjusted by using a design with a grid of holes 406 (e.g., "air" holes) within a dielectric substrate 308 to lower its overall dielectric constant $d_k$. In some embodiments, the dielectric constant of the substrate can be tailored by additive manufacturing techniques, such as by varying a dielectric ratio and/or air density ratio during a fabrication process, (e.g., by additively manufacturing a "porous" dielectric region).

As shown in FIG. 4, the depiction of the first circular parasitic array 106 has been simplified for illustrative purposes. For example, the first circular parasitic array 106 may include multiple rings of switched monopoles 404. In some embodiments, some or all of the monopoles 402, 404 can be either outside the holes 406, as shown in FIG. 4, or inside some or all of the holes 406. In some embodiments, the diameters, spacing, and/or number of holes 406 may affect the amount of dielectric const lowering. In some embodiments, the holes 406 may be blind via holes produced by a PCB process and/or through-holes between monopole elements (e.g., the dielectric substrate 308 can have through holes that are machined and bonded to the lower monopole PCB metallic substrate surface).

Referring generally to FIGS. 1-4, in some embodiments, a system may include a circular parasitic array assembly 104, which may include a first circular parasitic array 106 and at least one positioned circular parasitic array (e.g., 108-1, 108-2, 108-3, and/or 108-4). The first circular parasitic array 106 may be configured to at least one of transmit or receive over a first bandwidth. The first circular parasitic array 106 may be defined by a physical cylindrical volume. The at least one positioned circular parasitic array (e.g., 108-1, 108-2, 108-3, and/or 108-4) may include a first positioned circular parasitic array 108-1. The first positioned circular parasitic array 108-1 may be configured to at least one of transmit or receive over a second bandwidth, the second bandwidth being a higher frequency bandwidth than the first bandwidth.

In some embodiments, the at least one positioned circular parasitic array further includes a second positioned circular parasitic array 108-2, which may be configured to at least one of transmit or receive over a third bandwidth (e.g., which may be the same or different than the second bandwidth), the third bandwidth being a higher frequency bandwidth than the first bandwidth. For example, the first bandwidth may be in a C band, and the second bandwidth may be in a Ku band or a Ka band. In some embodiments, the at least one positioned circular parasitic array further includes a third positioned circular parasitic array 108-3 configured to at least one of transmit or receive over a fourth bandwidth (e.g., which may be the same and/or different than the second bandwidth and/or the third bandwidth), the fourth bandwidth being a higher frequency bandwidth than the first bandwidth. For example, the first, second, and third positioned circular parasitic arrays 108-1, 108-2, 108-3 may be radially symmetrically arranged around a center monopole

402 of the first circular parasitic array 106, for example, so as to symmetrically perturb the first circular parasitic array 106. For example, the first bandwidth may be in a C band, the second bandwidth may be in a first Ku band, the third bandwidth may be in a second Ku band, and the fourth bandwidth may be in a Ka band. In some embodiments, the at least one positioned circular parasitic array further includes a fourth positioned circular parasitic array 108-4, which may be configured to at least one of transmit or receive over a fifth bandwidth (e.g., which may be the same and/or different than the second bandwidth and/or the third bandwidth), the fifth bandwidth being a higher frequency bandwidth than the first bandwidth.

In some embodiments, each of the first circular parasitic array 106 and the at least one positioned circular parasitic array (e.g., 108-1, 108-2, 108-3, and/or 108-4) has a separate radiofrequency (RF) feed and separate beam switching control signal.

In some embodiments, the system may include at least one processor 120, which may be configured to operate the first circular parasitic array 106 and the at least one positioned circular parasitic array of the circular parasitic array assembly 104.

In some embodiments, each of the at least one positioned circular parasitic array (e.g., 108-1, 108-2, 108-3, and/or 108-4) and the first circular parasitic array 106 may operate as a fixed mode passive antenna in at least one of an omnidirectional mode or a directional mode.

In some embodiments, at any given time, each of the at least one positioned circular parasitic array (e.g., 108-1, 108-2, 108-3, and/or 108-4) and the first circular parasitic array 106 may operate as an active mode antenna in at least one of an omnidirectional mode or a directional mode.

In some embodiments, at any given time, each of one or more of the at least one positioned circular parasitic array (e.g., 108-1, 108-2, 108-3, and/or 108-4) and the first circular parasitic array 106 may operate as a fixed mode passive antenna in at least one of an omnidirectional mode or a directional mode, and, at any given time (e.g., at least one another given time), each of at least one other of the at least one positioned circular parasitic array (e.g., 108-1, 108-2, 108-3, and/or 108-4) and the first circular parasitic array 106 may operate as an active mode antenna in at least one of an omnidirectional mode or a directional mode.

For example, one or more of the at least one positioned circular parasitic array (e.g., 108-1, 108-2, 108-3, and/or 108-4) and the first circular parasitic array 106 may operate in any of the following modes: omnidirectional (Omni) C Band+Omni Ku Band; Omni C Band+Active dual mode Ku Band; Active Dual-mode C Band+passive Ku omni; or Active Dual-mode C Band+Active Dual mode Ku omni. Similar permutations of dual band, tri-band, quad band, or quintuple band CPA assemblies 104 may be extrapolated, such as for C+Ku1+Ku2+Ka1+Ka2 Band integrated CPA assemblies.

In some embodiments, simultaneous dual C Band/Ku Band receive and transmit may be enabled, for example, due to a relatively narrow band of each antenna along with the wide frequency separation of the Ku to C Band. In some embodiments, at any given time, the first circular parasitic array 106 may be configured to one of transmit or receive while one or more of the at least one positioned circular parasitic array (e.g., 108-1, 108-2, 108-3, and/or 108-4) are configured to another of transmit or receive. In some embodiments, at any given time, the first circular parasitic array 106 may be configured to transmit while one or more of the at least one positioned circular parasitic array (e.g., 108-1, 108-2, 108-3, and/or 108-4) are configured to transmit. In some embodiments, at any given time, the first circular parasitic array 106 may be configured to receive while one or more of the at least one positioned circular parasitic array (e.g., 108-1, 108-2, 108-3, and/or 108-4) are configured to receive.

In some embodiments, the first circular parasitic array 106 may comprise a dielectric substrate 308 having an array of holes 406, wherein the array of holes may lower a dielectric constant of the dielectric substrate 308 as compared to another dielectric substrate lacking said array of holes 406.

In some embodiments, one or more of the at least one positioned circular parasitic array (e.g., 108-1, 108-2, 108-3, and/or 108-4) may be positioned above the first circular parasitic array 106, and/or the one or more of the at least one positioned circular parasitic array (e.g., 108-1, 108-2, 108-3, and/or 108-4) may be off-centered relative to a center monopole 402 of the first circular parasitic array 106.

In some embodiments, the circular parasitic array assembly 104 may have symmetric shunt loading.

As will be appreciated from the above, embodiments of the inventive concepts disclosed herein may be directed to a method and a system including circular parasitic array assembly (e.g., a multiple-band circular parasitic array assembly).

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:

a circular parasitic array assembly, comprising:

a first circular parasitic array configured to at least one of transmit or receive over a first bandwidth, the first circular parasitic array defined by a physical cylindrical volume; and at least one positioned circular parasitic array including a first positioned circular parasitic array and a second positioned circular parasitic array, each of the at least one positioned circular parasitic array positioned at least one of within the physical cylindrical volume of the first circular parasitic array or above the physical cylindrical volume of the first circular parasitic array, wherein the first positioned circular parasitic array is configured to at least one of transmit or receive over a second bandwidth, the second bandwidth being a higher frequency bandwidth than the first bandwidth, wherein the second positioned circular parasitic array is configured to at least one of transmit or receive over a third bandwidth, the third bandwidth being a higher frequency bandwidth than the first bandwidth.

2. The system of claim 1, wherein the third bandwidth is different than the second bandwidth.

3. The system of claim 2, wherein the first bandwidth is in a C band, wherein the second bandwidth is in a Ku band or a Ka band.

4. The system of claim 1, wherein the at least one positioned circular parasitic array further comprises a third positioned circular parasitic array configured to at least one of transmit or receive over a fourth bandwidth, the fourth bandwidth being a higher frequency bandwidth than the first bandwidth, wherein the fourth bandwidth is different than the second and third bandwidths.

5. The system of claim 4, wherein the first, second, and third positioned circular parasitic arrays are radially symmetrically arranged around a center monopole of the first circular parasitic array so as to symmetrically perturb the first circular parasitic array.

6. The system of claim 4, wherein the first bandwidth is in a C band, wherein the second bandwidth is in a first Ku band, wherein the third bandwidth is in a second Ku band, wherein the fourth bandwidth is in a Ka band.

7. The system of claim 4, wherein the at least one positioned circular parasitic array further comprises a fourth positioned circular parasitic array configured to at least one of transmit or receive over a fifth bandwidth, the fifth bandwidth being a higher frequency bandwidth than the first bandwidth.

8. The system of claim 1, wherein each of the first circular parasitic array and the first positioned circular parasitic array has a separate radiofrequency (RF) feed and separate beam switching control signal.

9. The system of claim 1, wherein each of the at least one positioned circular parasitic array and the first circular parasitic array operates as a fixed mode passive antenna in at least one of an omnidirectional mode or a directional mode.

10. The system of claim 1, wherein, at any given time, each of the at least one positioned circular parasitic array and the first circular parasitic array operates as an active mode antenna in at least one of an omnidirectional mode or a directional mode.

11. The system of claim 1, wherein, at any given time, each of one or more of the at least one positioned circular parasitic array and the first circular parasitic array operates as a fixed mode passive antenna in at least one of an omnidirectional mode or a directional mode, wherein, at any given time, each of at least one other of the at least one positioned circular parasitic array and the first circular parasitic array operates as an active mode antenna in at least one of an omnidirectional mode or a directional mode.

12. The system of claim 1, wherein, at any given time, the first circular parasitic array is configured to receive over the first bandwidth while one or more of the at least one positioned circular parasitic array are configured to receive over one or more other bandwidths, the one or more other bandwidths including the second bandwidth, each of the one or more other bandwidths being higher frequency bandwidths than the first bandwidth.

13. The system of claim 1, wherein the circular parasitic array assembly further comprises a first transceiver, at least one other transceiver, a modem, and at least one processor, the first transceiver at least connected to the first circular parasitic array, each of the at least one other transceiver at least connected to one of the at least one positioned circular parasitic array, the modem at least connected to each of the first transceiver and the at least one other transceiver, one or more of the at least one processor at least connected to the modem, wherein the circular parasitic array assembly has parasitic element control for each of the first circular parasitic array and the at least one positioned circular parasitic array.

14. The system of claim 1, wherein the first circular parasitic array comprises a dielectric substrate having an array of holes, wherein the array of holes lower a dielectric constant of the dielectric substrate as compared to another dielectric substrate lacking said array of holes.

15. The system of claim 1, wherein the first positioned circular parasitic array is positioned above the first circular parasitic array, wherein the first positioned circular parasitic array is off-centered relative to a center monopole of the first circular parasitic array.

16. The system of claim 1, wherein the first circular parasitic array comprises a ground plane having a void, wherein a printed circuit board (PCB) of the first positioned circular parasitic array is positioned within the void of the ground plane.

17. The system of claim 1, wherein the circular parasitic array assembly has symmetric shunt loading.

18. The system of claim 1, wherein the circular parasitic array has multiple mode omnidirectional and/or directional operation.

19. A system, comprising:

a circular parasitic array assembly, comprising:

a first circular parasitic array configured to at least one of transmit or receive over a first bandwidth, the first circular parasitic array defined by a physical cylindrical volume; and at least one positioned circular parasitic array including a first positioned circular parasitic array, each of the at least one positioned circular parasitic array positioned at least one of within the physical cylindrical volume of the first circular parasitic array or above the physical cylindrical volume of the first circular parasitic array, wherein the first positioned circular parasitic array is configured to at least one of transmit or receive over a second bandwidth, the second bandwidth being a higher frequency bandwidth than the first bandwidth, wherein, at any given time, the first circular parasitic array is configured to receive over the first bandwidth while one or more of the at least one positioned circular parasitic array are configured to receive over one or more other bandwidths, the one or more other bandwidths including the second bandwidth, each of the one or more other bandwidths being higher frequency bandwidths than the first bandwidth.

20. A system, comprising:

a circular parasitic array assembly, comprising:

a first circular parasitic array configured to at least one of transmit or receive over a first bandwidth, the first circular parasitic array defined by a physical cylindrical volume;

at least one positioned circular parasitic array including a first positioned circular parasitic array, each of the at least one positioned circular parasitic array positioned at least one of within the physical cylindrical volume of the first circular parasitic array or above the physical cylindrical volume of the first circular parasitic array, wherein the first positioned circular parasitic array is configured to at least one of transmit or receive over a second bandwidth, the second bandwidth being a higher frequency bandwidth than the first bandwidth;

a first transceiver;

at least one other transceiver;

a modem; and at least one processor, the first transceiver at least connected to the first circular parasitic array, each of the at least one other transceiver at least connected to one of the at least one positioned circular parasitic array, the modem at least connected to each of the first transceiver and the at least one other transceiver, one or more of the at least one processor at least connected to the modem, wherein the circular parasitic array assembly has parasitic element control for each of the first circular parasitic array and the at least one positioned circular parasitic array.

* * * * *